July 21, 1936. E. BAUMER Re. 20,036

GAMEBALL AND PROCESS OF COVERING SAME

Original Filed March 21, 1930

INVENTOR.
EDWARD BAUMER.
BY Allen & Allen
ATTORNEYS.

Reissued July 21, 1936 Re. 20,036

UNITED STATES PATENT OFFICE 20,036

GAMEBALL AND PROCESS OF COVERING SAME

Edward Baumer, Fort Thomas, Ky., assignor to The P. Goldsmith Sons Company, Cincinnati, Ohio, a corporation of Ohio Original No. 1,960,803, dated May 29, 1934, Serial No. 437,777, March 21, 1930. Application for reissue August 31, 1935, Serial No. 38,812

10 Claims. (Cl. 112—267)

My invention relates to covered game balls and to a novel method for securing covers to game balls with concealed stitching.

While, in the art, it is old as shown in the Melot Patent #289,297 to provide a game ball having a cover secured with concealing stitching, the process of stitching proposed by this patentee was to loosely stitch the meeting edges of the cover with a curved needle and then subsequently go over the stitches and pull them taut with an awl. This process was not at all satisfactory as it required a double job and the cover after it was completed, was not entirely tight.

It is an object of my invention to provide a process of stitching which does not require a subsequent tightening of the stitches and in which the concealed stitches are pulled tight with the needle with which the stitches are originally placed in the cover. Another object of my invention is to insert stitches in and out with the inward stitch passing lengthwise through the flesh side of the leather so that they will tend to be bound firmly in place.

A still further object is the provision of a novel method of stitching which incorporates in part what has been suggested in the prior art with the addition of such steps from my new process as to render the manufacture of a ball accordingly, a commercial proposition.

Another object is the provision of perforations diagonally through the leather so that the stitches may be pulled through without difficulty, and so that all the stitches will lie transverse to the top and bottom surfaces of the leather within the skin itself as in contrast to extending across from the upper to the lower surface of the leather.

The above objects and others to which reference will be made in the ensuing disclosure I acomplish by that certain combination and arrangement of parts of which I have shown a preferred modification.

Referring to the drawing:—

Referring first to Figures 1 to 5, the inner body 1 of the ball is first prepared and then two cover pieces 2 are fitted together and preferably tacked in position on the body. The cover pieces may have spaced holes 3 or marks to indicate where the point of the needle is to be applied during the stitching operation. With a skilled operator however the holes need not be formed in the cover.

The end of the stitching thread is first tied and the first stitch is applied from the inside of the cover through the hole, if the cover is of this type. After drawing through the thread the needle is inserted back into the hole and then passed lengthwise through the border of the flesh side of the cover piece. The needle is then inserted underneath the opposed cover piece and up through another of the holes. The thread is then drawn through the hole and the needle inserted back into the hole and passed lengthwise through the border of the flesh portion of the cover. The stitching is thus proceeded with until the entire cover has been stitched.

Figure 1:
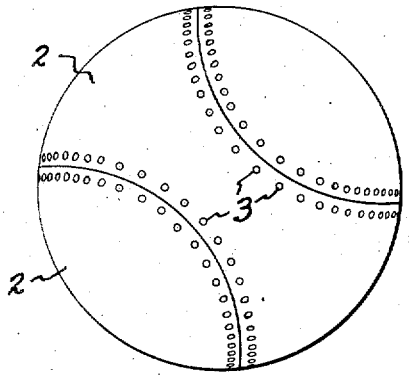
Figure 1 is a perspective view of a completed ball stitched in accordance with my invention.
Figure 2:
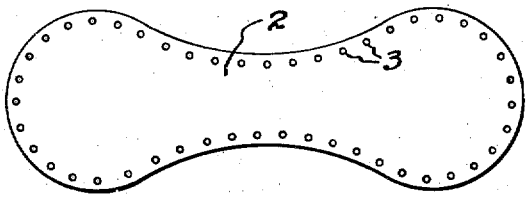
Figure 2 is a plan view of one of the cover pieces.
Figure 3:
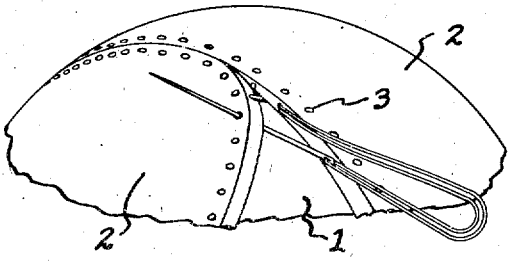
Figure 3 is a perspective view showing the outward stitch.
Figure 4:
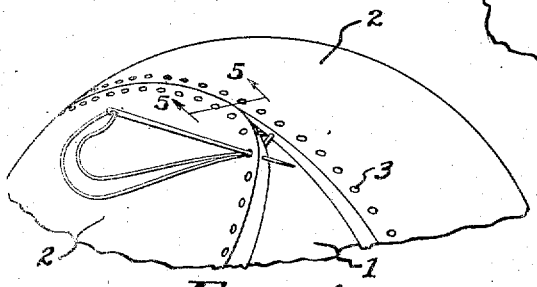
Figure 4 is a perspective view showing the inward stitch.
Figure 5:
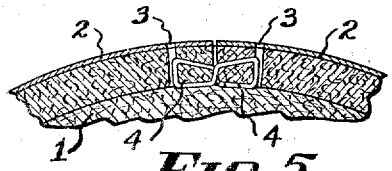
Figure 5 is a detail sectional view taken along the lines 5—5 in Figure 4.

The two stitching operatins are indicated in Figures 3 and 4. Fig. 3 showing the vertical or outward stitch and Fig. 4 the return or diagonal stitch. The result of applying the stitches in the manner which has been described is that loops of thread are formed as indicated at 4 in Figure 5 which are securely held in position within the tough flesh portions of the cover pieces.

As has been stated the holes 3 may be omitted, the operator then following the same manner of stitching but without having the holes to be used as guides.

In developing a machine for punching the stitch perforations I may punch one set of holes across from upper to lower surface, and I may punch other holes diagonally in through the abutting joining edges of the cover pieces so that the piercing of the leather with the needle point is made unnecessary.

Figure 7:
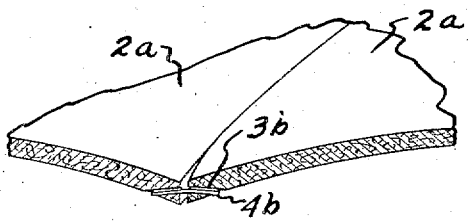
Figure 7 is a perspective view of a portion of a cover showing a still further stitching arrangement.
Figure 8:
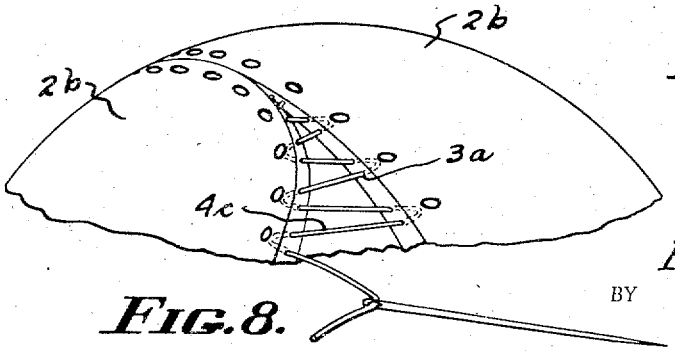
Figure 8 is a similar view showing the arrangement of Fig. 7 partly formed.

I may further punch the needle perforations only through the meeting faces of the cover pieces so that a type of stitching illustrated in Figure 7 will be employed. In this modification the cover pieces 2a have their meeting edges pierced by diagonal perforations extending laterally up through the cover pieces, as indicated at 3b. The threads will then assume the form of return loops 4c, as seen in Fig. 8, and as in the first described modification the threads will be pulled down into the body of the leather below the surface.

Figure 6:
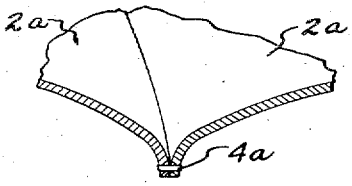
Figure 6 is a detail of part of the type of stitching which may be employed in combination with the type of stitching illustrated in Figure 5.

As a still further modification I may stitch part of the cover pieces 2a by the old and well known expedient shown in Figure 6 with stitches 4a. Then after reversing the cover and inserting the body of the ball, I complete the stitching of the cover by employing a curved needle and inserting stitches 4b through preformed perforations 3b, as shown in Figure 7, which have previously been pierced from the meeting faces of the pieces diagonally downwardly and out through the flesh surface of the cover.

When the cover is completely stitched, there will be no exposed stitching so that the wearing away or breaking of the stitches with use is avoided, and there is no tendency for the outside surface or skin side of the cover to split.

Having thus described my invention, what I claim as new and desire to secure by Letters Patent, is:—

1. A covered game ball the opposed edges of the cover of which is secured with stitching which for each stitch passes from the inside of the cover partway from the inside to the outer surface of the cover through the flesh portion of the cover substantially at right angles to the cover surface, and then diagonally along and out through the edge of the flesh portion to the beginning of the next stitch.

2. The method of stitching together two pieces of cover with their edges abutting on a game ball, consisting in making successive passages of thread through the inner surface of an edge portion of one piece, partly out through the piece, then diagonally along and out through the edge of the piece, then under the edge portion of the other piece and partly out therethrough, then diagonally further along and out through the edge of the other piece and returning under the edge portion of the first piece.

3. The method of stitching together two pieces of cover with their edges abutting on a game ball, consisting in making successive passages of thread through the inner surface of an edge portion of one piece, partly out through the piece, then diagonally along and out through the edge of the piece, then under the edge portion of the other piece and partly out therethrough, then diagonally further along and out through the edge of the other piece and returning under the edge portion of the first piece, and drawing the thread taut and thereby causing complete abutment of the edges of the pieces, in the course of each one of said passages of the thread.

4. The method of stitching together two pieces of cover with their edges abutting on a game ball, consisting in preforming perforations through the edge portions of the pieces at intervals therealong, and then making successive passages of thread partly out through a perforation of one piece, then through a side of the perforation and diagonally along and out through the edge of the piece, then under the edge portion of the other piece and partly out through a perforation thereof, then through a side of this perforation and further diagonally along and out through the edge portion of this other piece and returning under the edge portion of the first piece.

5. The method of stitching together two pieces of cover with their edges abutting on a game ball, consisting in preforming perforations through the edge portions of the pieces at intervals therealong, and then making successive passages of thread out through a perforation of one piece and then back into and partly through the same perforation, then through a side of the perforation and diagonally along and out through the edge of the piece, then under the edge portion of the other piece and out through a perforation thereof and then back into and partly through this same perforation, then through a side of this perforation and further diagonally along and out through the edge portion of this other piece and returning under the edge portion of the first piece.

6. The method of stitching together two pieces of cover with their edges abutting on a game ball, consisting in preforming perforations through the edge portions of the pieces at intervals therealong, and then making successive passages of thread out through a perforation of one piece and then back into and partly through the same perforation, then through a side of the perforation and diagonally along and out through the edge of the piece, then under the edge portion of the other piece and out through a perforation thereof and then back into and partly through this same perforation, then through a side of this perforation and further diagonally along and out through the edge portion of this other piece and returning under the edge portion of the first piece, and drawing the thread taut and thereby causing complete abutment of the edges of the pieces at each passage of the thread out through a perforation.

7. The method of stitching a cover on a game ball which consists in inserting concealed stitches through the sides of perforations adjacent to opposed meeting edges of the cover pieces, and drawing the stitches taut immediately after each stitch is inserted, by passing a thread out from one meeting edge through a perforation adjacent the opposed meeting edge, then passing the thread back partly through the same perforation, and then passing the thread through this opposed meeting edge.

8. The method of forming all of the stitches of a cover on a game ball with the cover in its inside-in condition, which consists in forming each one of the stitches by passing a thread from one meeting portion of the cover through the abutting edge of the opposite meeting portion and then out through the outer surface of this opposite portion, then back into the perforation occupied by the just previous passage of the thread, and again through the abutting edge of this opposite portion at a point different from the previous passage of the thread through this abutting edge, and therefrom again into the first mentioned meeting portion, said method being characterized by the drawing of the stitch taut at a stage within the cycle of formation of each stitch, whereby all of the previously formed stitches are taut at the time of starting of each stitch of all of the stitches in the cover.

9. A method of forming at least a final series of stitches of a cover on a game ball with the cover in its final inside in condition, which consists in forming each one of said series of stitches by passing a thread from one meeting portion of the cover through the abutting edge of the opposite meeting portion and then out through the outer surface of this opposite portion, then back into the perforation occupied by the just previous passage of the thread, and again through the abutting edge of this opposite portion at a point different from the previous passage of the thread through this abutting edge, and therefrom again into the first mentioned meeting portion, said method being characterized by the drawing of the stitch taut at a stage within the cycle of formation of each stitch of said series, whereby all of the previously formed stitches of said series are taut at the time of starting of each stitch of all of the stitches in said series.

10. The method of stitching together two pieces of cover with their edges abutting on a game ball, consisting in making successive passages of thread through the inner surface of an edge portion of one piece, partly out through the piece, then out through the edge of the piece, then under the edge portion of the other piece and partly out therethrough, then out through the edge of the other piece and returning under the edge portion of the first piece.

EDWARD BAUMER.